(12) United States Patent
Lackner et al.

(10) Patent No.: US 6,790,430 B1
(45) Date of Patent: Sep. 14, 2004

(54) HYDROGEN PRODUCTION FROM CARBONACEOUS MATERIAL

(75) Inventors: Klaus S. Lackner, Los Alamos, NM (US); Hans J. Ziock, Los Alamos, NM (US); Douglas P. Harrison, Baton Rouge, LA (US)

(73) Assignee: The Regents of the University of California, Los Alamos, NM (US)

( * ) Notice: Subject to any disclaimer, the term of this patent is extended or adjusted under 35 U.S.C. 154(b) by 0 days.

(21) Appl. No.: 09/528,122

(22) Filed: Mar. 16, 2000

Related U.S. Application Data
(60) Provisional application No. 60/170,117, filed on Dec. 9, 1999.

(51) Int. Cl.$^7$ .................................................. C01B 3/02
(52) U.S. Cl. ...................... 423/648.1; 252/373; 423/170
(58) Field of Search ................................. 423/165, 430, 423/637, 648.1; 252/373; 208/414; 201/38; 48/61, 77, 99, 101, 202; 422/170, 189

(56) References Cited

U.S. PATENT DOCUMENTS

| | | | |
|---|---|---|---|
| 1,135,355 A | 4/1915 | Claude | |
| 1,583,673 A | * 5/1926 | De Graer ................. | 423/648.1 |
| 3,152,063 A | 10/1964 | Schroeder et al. ............ | 208/10 |
| 3,759,677 A | 9/1973 | White .......................... | 48/209 |
| 3,807,090 A | 4/1974 | Moss ........................... | 48/128 |
| 3,823,227 A | * 7/1974 | White ......................... | 423/655 |
| 3,927,996 A | 12/1975 | Kundsen et al. .......... | 48/197 R |
| 4,032,305 A | 6/1977 | Squires .......................... | 48/73 |
| 4,098,960 A | 7/1978 | Gacnon ....................... | 429/25 |
| 4,202,167 A | 5/1980 | Suggitt ....................... | 60/39.02 |
| 4,312,638 A | 1/1982 | Koump ........................ | 48/197 |
| 4,353,713 A | * 10/1982 | Cheng .......................... | 48/202 |
| 4,390,349 A | * 6/1983 | Jen-Tung .................. | 48/197 R |
| 4,448,588 A | 5/1984 | Cheng ........................... | 48/99 |
| 4,597,771 A | 7/1986 | Cheng ........................... | 48/77 |

(List continued on next page.)

OTHER PUBLICATIONS

Lackner, Klaus S., Hans–Joachim Ziock and Douglas Harrison, "Calcium Oxide Assisted Hydrogen Production from Fossil fuels and Water," Los Alamos National Laboratory, 1999.

(List continued on next page.)

*Primary Examiner*—Stanley S. Silverman
*Assistant Examiner*—Maribel Medina
(74) *Attorney, Agent, or Firm*—Gemma Morrison Bennett; Samuel M. Freund; Samuel L. Borkowsky (57) ABSTRACT

Hydrogen is produced from solid or liquid carbon-containing fuels in a two-step process. The fuel is gasified with hydrogen in a hydrogenation reaction to produce a methane-rich gaseous reaction product, which is then reacted with water and calcium oxide in a hydrogen production and carbonation reaction to produce hydrogen and calcium carbonate. The calcium carbonate may be continuously removed from the hydrogen production and carbonation reaction zone and calcined to regenerate calcium oxide, which may be reintroduced into the hydrogen production and carbonation reaction zone. Hydrogen produced in the hydrogen production and carbonation reaction is more than sufficient both to provide the energy necessary for the calcination reaction and also to sustain the hydrogenation of the coal in the gasification reaction. The excess hydrogen is available for energy production or other purposes. Substantially all of the carbon introduced as fuel ultimately emerges from the invention process in a stream of substantially pure carbon dioxide. The water necessary for the hydrogen production and carbonation reaction may be introduced into both the gasification and hydrogen production and carbonation reactions, and allocated so as transfer the exothermic heat of reaction of the gasification reaction to the endothermic hydrogen production and carbonation reaction.

38 Claims, 2 Drawing Sheets

U.S. PATENT DOCUMENTS

| | | | |
|---|---|---|---|
| 4,677,829 A | 7/1987 | Archer et al. | 60/39.02 |
| 4,936,869 A | 6/1990 | Minderman et al. | 48/77 |
| 4,976,940 A | 12/1990 | Paulson | 423/648.1 |
| 5,336,317 A | 8/1994 | Beisswenger et al. | 106/745 |
| 5,401,589 A | 3/1995 | Palmer et al. | 429/13 |
| 5,577,346 A | 11/1996 | Malone | 48/197 R |
| 5,955,039 A | 9/1999 | Dowdy | 422/189 |
| 6,013,158 A | 1/2000 | Wootten | 202/99 |

OTHER PUBLICATIONS

Fink, Carl E., George Curran and John D. Sudbury, "$CO_2$ Acceptor Process Pilot Plant—1974," *Proceedings of Sixth Synthetic Pipeline Gas Symposium*, American Gas Association, Office of Coal Research, Department of the Interior and International Gas Union, Oct. 28–30, 1974.

McCoy, Duane C., George P. Curran and John D. Sudbury, "$CO_2$ Acceptor Process Pilot Plant—1976," *Proceedings of Sixth Synthetic Pipeline Gas Symposium*, American Gas Association, Office of Coal Research, Department of the Interior and International Gas Union, Oct. 28–20, 1976.

Balasubramanian, B., A. Lopez Ortiz, S. Kaytakoglu, D. P. Harrison, "Hydrogen from methane in a single–step process," *Chemical Engineering Science* 54 (1999) 3543–3552.

Han, Chun and Douglas P. Harrison, "Multicycle Performance of a Single–Step Process for $H_2$ Production," *Separation Science and Technology*, 32(1–4), pp. 681–697, 1997.

Han, Chun and Douglas P. Harrison, "Simultaneous Shift Reaction and Carbon Dioxide Separation for the Direct Production of Hydrogen," *Chemical Engineering Science*, vol. 49, No. 24B, pp. 5875–5883, 1994.

Curran, George P., Carl E. Fink and Everett Gorin, "$CO_2$ Acceptor Gasification Process," Advances in Chemistry Series, Frank C. Schora, Jr., (ed.), American Chemical Society, vol. 69, 141–165 (1967).

"Coal Gasification R&D Goes on Despite Doubts", *Chemical and Engineering News*, Nov. 20 (1978).

\* cited by examiner

HYDROGEN PRODUCTION FROM CARBONACEOUS MATERIAL

This application claims the benefit of U.S. Provisional Application No. 60/170,117, filed Dec. 09, 1999.

This invention was made with government support under Contract No. W-7405ENG-36 awarded by the U.S. Department of Energy. The government has certain rights in the invention.

TECHNICAL FIELD

This invention relates to methods and apparatus for generation of electricity from carbon containing fuels. More specifically, the present invention relates to hydrogen production and related energy production by gasification of coal.

BACKGROUND ART

International concerns over global warming are increasingly focused on the role of atmospheric greenhouse gases such as carbon dioxide. The increasing atmospheric concentration of carbon dioxide and its role as a greenhouse gas are resulting in various national and international efforts to either reduce the overall emissions of carbon dioxide or sequester such emissions for isolation and disposal into carbon dioxide disposal sinks other than the atmosphere.

Power plants fueled with gaseous, liquid or solid carbonaceous materials are a significant source of carbon dioxide, yet generation of electricity using such power plants remains a necessary source of electrical power in many countries for the foreseeable future. Unlike automobiles and other dispersed sources of carbon dioxide, power plants burning carbon containing fuels constitute a relatively limited number of large stationary point sources of carbon dioxide. As such they are likely targets of various regulatory initiatives being considered, including, for example, energy taxes, emissions taxes, and mandated carbon dioxide scrubbing measures. Consequently, there is a need for improved methods of extracting the energy of combustion from carbon containing fuels such as coal while also enabling sequestration of the resulting carbon dioxide for disposal by various means.

Considerable effort has been expended on developing various methods for the gasification of coal for purposes such as the reduction of air pollution or production of a more transportable, gaseous source of energy. The well known water-gas production reaction is one method of producing hydrogen from coal:

$$C+H_2O \rightarrow CO+H_2 \qquad (1)$$

A related reaction is the water-gas shift reaction:

$$CO+H_2O \rightarrow CO_2+H_2 \qquad (2)$$

The water gas production reaction (1) can be combined with the water gas shift reaction (2) to produce additional hydrogen. The net reaction is:

$$C+2H_2O \rightarrow CO_2+2H_2 \qquad (3)$$

The net reaction (3) is highly endothermic at standard conditions, i.e., at approximately ambient temperature and one atmosphere of pressure, on the order of 170 to 180 kJ/mole, when liquid water is used. (References to endothermic, exothermic and heats of reaction herein refer to standard conditions, i.e., approximately ambient temperature and approximately one atmosphere of pressure.) All three of the above reactions produce hydrogen, and each requires separation of the resulting hydrogen from the other gaseous reaction products for practical application in which carbon dioxide-free emissions are desired.

It is also well known that direct hydrogenation of coal, using gaseous hydrogen at elevated temperatures, can be achieved to produce gaseous reaction products consisting primarily of methane, by the reaction:

$$C+2H_2 \rightarrow CH_4 \qquad (4)$$

The advantage of this reaction is that it is exothermic (75 kJ/mole). However, it requires a source of hydrogen.

It has also been known to use a calcium oxide based process for generating hydrogen from carbon. The summary reaction for this process is:

$$CaO+C+2H_2O_{(1)} \rightarrow CaCO_3+2H_2 \qquad (5)$$

The advantage of this reaction is that it is essentially energy neutral, being exothermic to the extent of only about 0.6 kJ/mole when using liquid water.

This reaction (5) has been utilized in a single reaction vessel in the process disclosed in the paper entitled "CO$_2$ Acceptor Process Pilot Plant—1976," published in the proceedings of the Eighth Synthetic Pipeline Gas Symposium, American Gas Association, Oct. 18, 1976. However, there have been difficulties in conducting this reaction, especially to high fractional completion, because the mixing of coal and calcium oxide poses several problems. The coal produces ash, which reacts with the CaO to produce various silicates which interfere with the reaction. Other impurities in coal, such as sulfur, also interfere with the carbonation of CaO to CaCO$_3$.

Accordingly, it is an object of the present invention to provide an energy efficient method and apparatus for the production of hydrogen from coal, other fossil fuels, or other carbonaceous substances.

It is also an object of the present invention to produce hydrogen from coal while also producing carbon dioxide in a substantially pure stream such that it can be sequestered and disposed of to a sink other than the atmosphere.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims. The claims are intended to cover all changes and modifications within the spirit and scope thereof.

DISCLOSURE OF INVENTION

To achieve the foregoing and other objects, and in accordance with the purposes of the present invention, as embodied and broadly described herein, there is provided a method and apparatus for calcium oxide assisted hydrogen production from carbonaceous materials such as coal. The two-step invention process includes two separate groups of reactions conducted in separate vessels. Gasification of coal by hydrogenation in a gasification vessel is followed by hydrogen production from methane and water that is driven using a calcium oxide carbonation reaction in a carbonation vessel. In the gasification step, coal is hydrogenated with hydrogen to produce a gaseous reaction product consisting primarily of methane. This gaseous reaction product is conveyed to the carbonation vessel, where it is reacted in a carbonation reaction with water and calcium oxide to produce hydrogen and solid calcium carbonate and to remove carbon dioxide from the product gas stream.

A portion of the hydrogen produced in the carbonation reaction may be returned to the gasification vessel to provide the supply of hydrogen for the hydrogenation of the coal.

In accordance with one aspect of the invention, another portion of the hydrogen produced in the carbonation vessel may be used to heat a calcination vessel, where the calcium carbonate produced in the carbonation reaction is calcined so as to produce regenerated calcium oxide, which is in turn returned to the carbonation vessel. Calcium oxide may be continuously introduced into the carbonation vessel where it reacts with the carbon dioxide produced from the reaction of the methane with the water to form calcium carbonate, which may be withdrawn from the carbonation vessel to be calcined and recycled back into the carbonation vessel as calcium oxide, in a multi-pass loop process.

The amount of hydrogen produced in the carbonation vessel is sufficient to both regenerate the calcium oxide necessary for the hydrogen production in the carbonation vessel and to hydrogenate the coal in the gasification vessel, and yet still provide a net output of hydrogen for the production of electrical energy or for other purposes. Importantly, substantially all of the carbon initially introduced as coal into the gasification reaction ultimately emerges from the invention process in a stream of substantially pure carbon dioxide from the calcination reaction.

In accordance with another aspect of the invention, the water needed for the hydrogen production in the carbonation vessel may be introduced into both the gasification vessel and the carbonation vessel, and allocated between the two reaction vessels so as to separately minimize the net heat generated in each reaction vessel. That is, water introduced into the gasification vessel is vaporized and absorbs part of the exothermic heat of the gasification reaction, and in addition reacts to some extent with the coal to produce carbon monoxide and hydrogen by the water-gas production reaction which is an endothermic reaction.

The sum of the reactions in the carbonation vessel can be either endothermic or exothermic, depending upon whether water is introduced as liquid or steam and depending upon the particular mix of gases coming into the carbonation vessel from the gasification vessel. By regulating the flow of liquid water into each reaction vessel, the net reactions in each reaction vessel can be maintained in an approximately energy neutral state, thus avoiding the need for any other heat transfer mechanism.

In accordance with yet another aspect of the invention, the produced hydrogen may be used to produce electricity in a turbine, high temperature fuel cell or other high temperature electricity generating device. Heat from the turbine, fuel cell or other high temperature electricity generating device may be used-to calcine the calcium carbonate produced in the carbonation vessel.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

BEST MODES FOR CARRYING OUT THE INVENTION

The present invention provides a method and apparatus for reacting coal and other carbonaceous fuels in a two-step process to produce a substantially pure stream of hydrogen, as well as a stream of substantially pure carbon dioxide which is ready for subsequent sequestration and disposal.

While the invention will be discussed below with reference to the use of coal, it will be understood that other solid or liquid carbon containing materials may also be used.

In accordance with the present invention, coal is gasified with hydrogen in a gasification reaction vessel at elevated temperatures to form a methane-rich gaseous reaction product, which is removed from the gasification reaction vessel and subsequently reacted with calcium oxide and water in a carbonation vessel to produce hydrogen, which may be used for energy production or other purposes. The carbon initially introduced into the gasification vessel as coal is incorporated into solid calcium carbonate as a result of the carbonation reaction in the carbonation vessel, and is thereby separated from the hydrogen. The calcium carbonate may be removed, calcined, and recycled as calcium oxide to sustain the hydrogen production and carbonation reaction, with the carbon dioxide from the calcination reaction forming a separate stream that is easily transported from the calcination reaction vessel using pressure generated by the calcination reaction. Thus, substantially all of the carbon initially introduced into the process of the invention may be ultimately discharged from the calcination process as an essentially pure stream of pressurized carbon dioxide.

It will be understood that while the gasification reactions and the carbonation reactions of the invention can be conducted in separate reaction vessels or zones, for the purposes of easy description, reference is made simply to separate reaction vessels. Any reference to a vessel will be taken to mean any suitable means for isolating the reaction to a separate zone.

Catalysts as known to those skilled in the art can be used in the practice of the invention if desired. It will be understood that, depending upon the temperatures and pressures used, purity of the carbonaceous fuel material, and other operating conditions, some catalysts may be necessary.

A portion of the hydrogen produced in the carbonation vessel may be used to provide the energy necessary to calcine the calcium carbonate, and another portion of the hydrogen may be supplied to the coal hydrogenation reaction, with the remainder being available for the production of electrical energy or for other purposes.

As noted above, coal contains ash and other impurities such as sulfur which make it difficult to conduct the gasification reaction and the calcium oxide carbonation driven hydrogen production reaction in a single step, especially if a high degree of reaction completion is desired. The present invention is based on the recognition that it is possible to obtain the equivalent of reaction (5) above, by the combination of the following reaction steps, which are independently conducted in separate reaction vessels:

Step 1 (gasification and hydrogenation):

$$\text{ash} + C + 2H_2 \rightarrow CH_4 + \text{ash} \tag{6}$$

Step 2 (hydrogen production and carbonation):

$$CaO + CH_4 + 2H_2O_{(l)} \rightarrow CaCO_3 + 4H_2 \tag{7}$$

Reaction (6) is a gasification and hydrogenation reaction, which will be referred to herein as the gasification reaction. Reaction (7) is a hydrogen production and carbonation reaction, which will be referred to herein as the carbonation reaction.

Conducting reactions (6) and (7) in separate vessels ensures that the ash from the coal remains physically isolated from the calcium oxide and calcium carbonate in the carbonation vessel. This in turn allows the calcium carbonate to be removed, calcined, and subsequently reintroduced into the carbonation vessel as calcium oxide, without contamination with ash in the gasification vessel.

The present invention utilizes the coal gasification reaction (6) above, which is based primarily on hydrogen rather than on liquid water or steam. Direct hydrogenation of coal is exothermic, in contrast to gasification with liquid water, steam or carbon dioxide, which is endothermic. Nevertheless, selected amounts of steam or carbon dioxide may be used to control the rate of gasification.

As already noted, the calcium oxide based reaction (5) above is essentially energy neutral when the water of reaction is introduced in liquid form. Thus the combination of the gasification reaction (6) and the carbonation reaction (7) is also essentially energy neutral. Taken individually, the hydrogenation reaction (6) is exothermic, having an enthalpy of approximately −75 kJ/mole, while the hydrogen production and carbonation reaction (7) is endothermic by approximately the same amount.

In accordance with another aspect of the invention, the enthalpy necessary to sustain the endothermic carbonation reaction (7) can be obtained from the excess heat given off by the gasification reaction (6). The needed enthalpy (~75 kJ/mole C) for the carbonation reaction (7) is relatively small and is approximately the heat of vaporization of the 2 moles of liquid water needed per mole of $CH_4$ for the carbonation reaction (7). Thus, by introducing some or all of the liquid water necessary for the hydrogen production and carbonation reaction (7) into the gasification reaction (6), some or all of the excess enthalpy released by the gasification reaction (6) can be conveyed to the hydrogen production and carbonation reaction (7) in the form of vaporized water, and because of the overall energy neutrality of the combined reactions, relatively little net heat is either generated or required by the two reactions. In practice, some of the water introduced into the gasification vessel may react with the coal by the water gas reaction (1) and thereby reduce the actual amount of water needed to be introduced into the gasification vessel.

This process has considerable flexibility, provides for essentially independent operating temperatures for the gasification and carbonation vessels, and allows control of the gasification rate, control of the operating temperatures, and essentially eliminates the need for heat transfer between the gasification and carbonation vessels. Water can also be injected in the form of steam supplied externally as needed to regulate the heat that must be transferred between the reactions and to make up for any heat losses. Relative allocation of the amounts of water introduced into the two vessels allows for the control of temperatures and other parameters of the two reactions. Such allocation of water also enables compensation for variations in the properties of various types of coal or other carbonaceous feed materials. Alternatively, traditional heat exchange equipment may be employed to adjust the heat balance between the two vessels.

Figure 1:
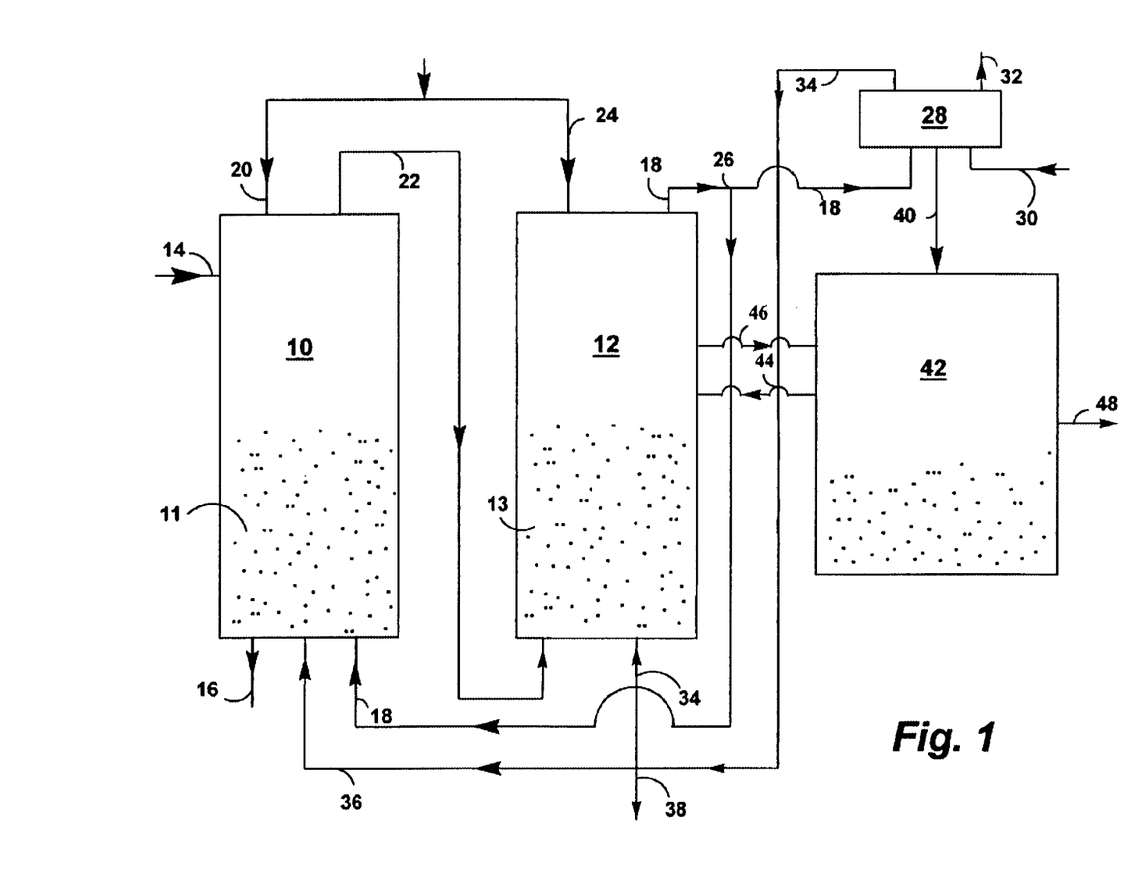
FIG. 1 is a schematic representation of an apparatus used to practice the present invention.

In a preferred embodiment of the invention shown in the schematic illustration of FIG. 1, a coal gasification vessel 10 having a fluidized bed 11 of coal is adjacent or proximate to a carbonation vessel 12 having a fluidized bed 13 of calcium oxide. Alternatively, a single reactor vessel may be partitioned into two separate, thermally insulated reaction regions or chambers, one for gasification and one for hydrogen production and carbonation. Generally, fluidized bed reactors are presently preferred, although vessels suitable for packed bed, entrained gas, or other operating conditions may be used for the gasification and carbonation reactor vessels 10 and 12.

Coal is conveyed through a suitable entry port 14 into the gasification vessel 10. The gasification vessel 10 has a second opening 16 suitable for removing ash from the gasification vessel 10.

A conduit 18 for introduction of hydrogen from the carbonation vessel 12 into the gasification vessel 10 is provided. The flow of hydrogen may have therein a minor amount of water in the form of steam or other impurities.

When fluidized bed reactors as depicted in the schematic of FIG. 1 are used, the upper portion of the carbonation vessel 12 is preferably connected by conduit 18 to the lower portion of the gasification vessel 10 so that the hydrogen conducted from the upper portion of the carbonation vessel 12 passes into the lower portion of the gasification vessel 10 and flows upwardly through the fluidized bed 11 therein. This flow pattern maximizes contact of the hydrogen with the coal or other fuel in the gasification vessel 10. With other types or configurations or relative positions of reactors, other connection locations may be preferable.

Methane and other hydrocarbon gases are formed in the gasification vessel 10 when the coal is contacted with hydrogen. It is not necessary to add any air or oxygen to the mixture in the gasification vessel 10 where the following reactions are occurring. A major portion of the coal reacts with the hydrogen to form methane in accordance with reaction (6) above:

$$ash + C + 2H_2 \rightarrow CH_4 + ash$$

To the extent that there is water present, some of the coal may react with the water by the water-gas production reaction (1) above:

$$C + H_2O \rightarrow CO + H_2$$

Some of the carbon monoxide may react with additional water by the water-gas shift reaction (2):

$$CO + H_2O \rightarrow CO_2 + H_2$$

Other reactions producing ethane and higher hydrocarbons also occur in lesser quantities in the gasification reaction vessel 10.

A conduit 20 for introduction of water into the gasification vessel 10 is provided. The water conduit 20 can be positioned to either increase or decrease contact of the water with the hydrogen and coal. Maximizing contact will promote reactions (1) and (2), depending upon choice of catalyst and pressure. The water is also used to control the temperature of the reactions occurring in the gasification vessel 10. Converting the water to steam absorbs excess heat:

$$H_2O_{(l)} + heat \rightarrow H_2O_{(g)} \qquad (8)$$

The amount of water introduced into the gasification vessel 10 as either liquid or steam is controlled such that the fractional sum of heats of reaction for reactions (6), (1), (2) and (8) occurring in the gasification vessel 10 is essentially neutral.

A fraction of the liquid water or steam introduced into the gasification vessel 10 can also be introduced through the entry port 14 and used as a means of conveying the coal into the gasification vessel 10.

The gasification vessel 10 is operated at a temperature sufficient to support the gasification reactions, which are believed to involve two separate stages: a first very rapid stage involving hydrogenation of the volatiles driven off the coal by pyrolysis and a second slower stage involving methanation of the residual char left after pyrolysis. The gasification vessel 10 operating temperature generally should be in the range from about 400° C. to about 2000° C. depending on the operating pressures and desired rates of reaction. A temperature in the range from about 700° C. to about 1500° C. is generally presently preferred if fluidized bed reactors are used and depending upon choice of catalysts, pressures and desired reaction rates. Presently most preferred are gasification vessel 10 operating temperatures in the range from about 800° C. to about 1300° C.

The gasification vessel 10 may be operated over a broad range of pressures depending upon type of reactors used, fuel components, and presence or absence of catalysts. Operating pressure can range from about 0.5 atmosphere to about 2000 atmospheres. Generally pressures in the range from about 1 to about 1000 atmospheres are presently preferred for use in fluidized bed reactors. Presently most preferred are gasification vessel operating pressures from about 10 atmospheres to about 1000 atmospheres. The operating pressures and temperatures used in vessel 10 are interrelated. Flow of gases may be effected by appropriate gas pumping apparatuses and valves as necessary, installed as needed in the conduits into and out of the gasification vessel 10.

The methane-rich mix of gasification products from the gasification vessel 10 is transported into the carbonation vessel 12 through conduit 22 which connects the gasification vessel 10 with the carbonation vessel 12. When fluidized bed reactors are employed in the configuration shown in FIG. 1, it is generally preferred to have the upper portion of the gasification vessel 10 in fluid communication with the lower portion of the carbonation vessel 12 so that the gasification products from the gasification vessel 10 are introduced into the lower portion of the carbonation vessel 12 so that contact of the gasification products with the calcium oxide is maximized.

Gasification products from the gasification vessel 10 comprise a mixture of a major portion of methane with smaller amounts of higher hydrocarbons, carbon monoxide, carbon dioxide, hydrogen, steam, sulfur compounds, and other impurities from the coal.

The sulfur compounds and other impurities-are-preferably removed from the gasification product mixture before they are introduced into the carbonation vessel by any convenient method such as a small calcium carbonate bed and a particulate removal method.

In the carbonation vessel 12, calcium oxide reacts with carbon dioxide produced by the several reactions occurring in the carbonation vessel 12 between the water and the mixture of gasification products from the gasification vessel 10. The primary reactions occurring in the carbonation vessel 12 are:

$$CH_4 + H_2O \rightarrow CO + 3H_2 \quad (9)$$

$$CO + H_2O \rightarrow CO_2 + H_2 \quad (2)$$

$$CaO + CO_2 \rightarrow CaCO_3 \quad (10)$$

These reactions are summarized by the net hydrogen production and carbonation reaction (7) stated above:

$$CaO + CH_4 + 2H_2O \rightarrow CaCO_3 + 4H_2$$

Other reactions also occur in the carbonation vessel 12 in relatively minor quantities. The thermodynamic equilibrium of the reactions in the carbonation vessel 12 is dominated by the hydrogen, excess water and excess calcium oxide. Substantially all the carbon combines to form calcium carbonate at equilibrium.

The carbonation vessel 12 is preferably operated at a temperature high enough to prevent calcium hydroxide from forming and a temperature cool enough for the calcium carbonate to remain stable. Temperatures in the range from about 400° C. to about 1500° C. can be used. Depending upon type of reactors, catalysts and pressures used, temperatures in the range from about 500° C. to about 1400° C. are presently preferred. Presently more preferred are carbonation vessel 12 operating temperatures in the range from about 500° C. to about 1200° C.

The carbonation vessel 12 generally can be operated at a broad range of pressures in the range from about 1 atmosphere to about 2000 atmospheres. Generally presently preferred, depending upon type of reactor, catalysts and temperatures used, are operating pressures in the range from about 1 atmosphere to about 1000 atmospheres. Presently more preferred carbonation vessel 12 operating pressures are in the range from about 10 atmospheres to about 200 atmospheres.

The carbonation vessel 12 has a conduit 24 for introducing water into the reactor to provide water for the hydrogen production and carbonation reaction and for controlling the temperature of the vessel. A common source for water may be used for providing water through conduit 20 to the gasification vessel 10 and through conduit 24 to the carbonation vessel 12, although independent flow and pressure controls may be required.

The vessels 10 and 12 can be held at constant and independent temperatures by adjusting the relative amounts of water input into the two vessels. For example, if the gasification vessel 10 is heating up excessively, then a larger fraction of the total amount of water can be directed to the gasification vessel 10. Conversely, if the gasification vessel 10 is cooling more than desired, steam instead of water can be injected into the gasification vessel 10, or more of the total amount of water can be apportioned to the carbonation vessel 12.

The conduit 18 for conducting hydrogen (with a minor amount of water vapor and other impurities) from the carbonation vessel 12 back into the gasification vessel 10 may have a T-joint 26 or other stream-separating accommodation so that a portion of the flow of hydrogen from the carbonation vessel 12 can be provided to a high temperature fuel cell 28 or other electricity generating device or transported away as a product stream.

The fuel cell 28 produces the electrical output of the invention process. Solid oxide fuel cells are presently preferred, although other types of fuel cells can also be employed. Alternately, rather than the fuel cell 28, other types of high temperature devices such as a hydrogen burning gas turbine can be used to generate electricity.

The fuel cell 28 is provided with an air inlet 30. In the fuel cell 28, the hydrogen from the carbonation vessel 12 is reacted with atmospheric oxygen, which may be pressurized, to form water and produce electricity with a heat by-product. A solid oxide fuel cell naturally separates the oxygen from the input airstream, thereby leaving separate exhaust streams of oxygen-depleted air and of steam. Oxygen-depleted air is transported away from the fuel cell 28 by conduit 32 for heat recovery. Steam is transported away from the fuel cell 28 by conduit 34, which feeds into the carbonation vessel 12. Conduit 34 may have additional branches 36 which feeds into the gasification vessel 10 or 38 which is for the purpose of bleeding off steam to maintain the overall water balance (steam and liquid water) of the overall process. Heat can be recovered from the gaseous streams exiting the fuel cell 28 by connections with conduits 32, 34, or by use of additional heat transfer equipment. For example, additional heat transfer equipment may be needed for use of heat from the fuel cell 28 to energize a calcination vessel 42.

A calcination vessel 42 is employed for a calcination process in which calcium oxide required for the hydrogen production and carbonation reaction is regenerated. Calcium carbonate in the carbonation vessel 12 is transported through conduit 44 into calcination vessel 42, typically as a powder in a gas stream when fluidized bed reactors are employed. Other solid transport methods are used when packed bed reactors are employed.

In the calcination vessel 42, the heat by-product from the fuel cell 28 or other electrical power generating device is used to calcium the calcium carbonate. Alternatively, a portion of the hydrogen gas being produced by the hydrogen production and carbonation reaction can be used to heat the calcination vessel 42. In another alternative, additional coal, char or methane from the gasification vessel 10 can be combusted to heat the calcination vessel 42.

In the calcination vessel 42 the calcium carbonate is decomposed by the reaction:

$$CaCO_3 \rightarrow CaO + CO_2 \quad (1)$$

The calcination vessel 42 is operated at a temperature sufficient to chemically convert the calcium carbonate into calcium oxide and carbon dioxide. Generally a temperature in the range from about 800° C. to about 2000° C. is useful. Preferably a temperature in the range from about 850° C. to about 1700° C., and more preferably in the range from about 900° C. to about 1500° C. is used, depending upon the desired output pressure and the heat source available. The temperature in the calcination vessel 42 is controlled by any suitable method. The amount of heat from fuel cell 28 transferred to the calcination vessel 42 can be adjusted as needed to maintain the desired temperature range.

The calcination vessel 42 can be operated at a broad range of pressures ranging from about 0.1 atmosphere to about 1500 atmospheres. Generally, depending upon type of vessel and temperatures used, an operating pressure in the range from about 1 atmosphere to about 500 atmospheres is used, with an operating pressure in the range from about 1 atmosphere to about 200 atmospheres being presently preferred.

Subsequent to the calcium oxide recovery step of reaction (11) in the calcination vessel 42, regenerated calcium oxide from the calcination of the calcium carbonate in the calcination vessel 42 is transported back into the carbonation vessel 12 by way of conduit 46 in the embodiment of the invention shown in FIG. 1. The regenerated calcium oxide is used again for reaction with additional coal gasification products coming from the gasification vessel 10 into the carbonation vessel 12. After recycling back into the carbonation vessel 42 many times the calcium oxide may likely have compromised reactivity. Additional calcium carbonate for making up losses can be introduced into the calcination vessel 42 and a compensating amount of spent calcium oxide or calcium carbonate removed from the calcination vessel 42.

A substantially pure stream of carbon dioxide from reaction (11) is conducted away from the calcination vessel 42 through an outlet 48. Removing the carbon dioxide drives the calcination reaction toward completion. The pressure of the emitted carbon dioxide stream can be adjusted by regulation of the temperature, conduit sizes, and other operating conditions of the calcination vessel 42. Generally the carbon dioxide will have a pressure in the range from about 1 atmosphere to less than 200 atmospheres.

Figure 2:
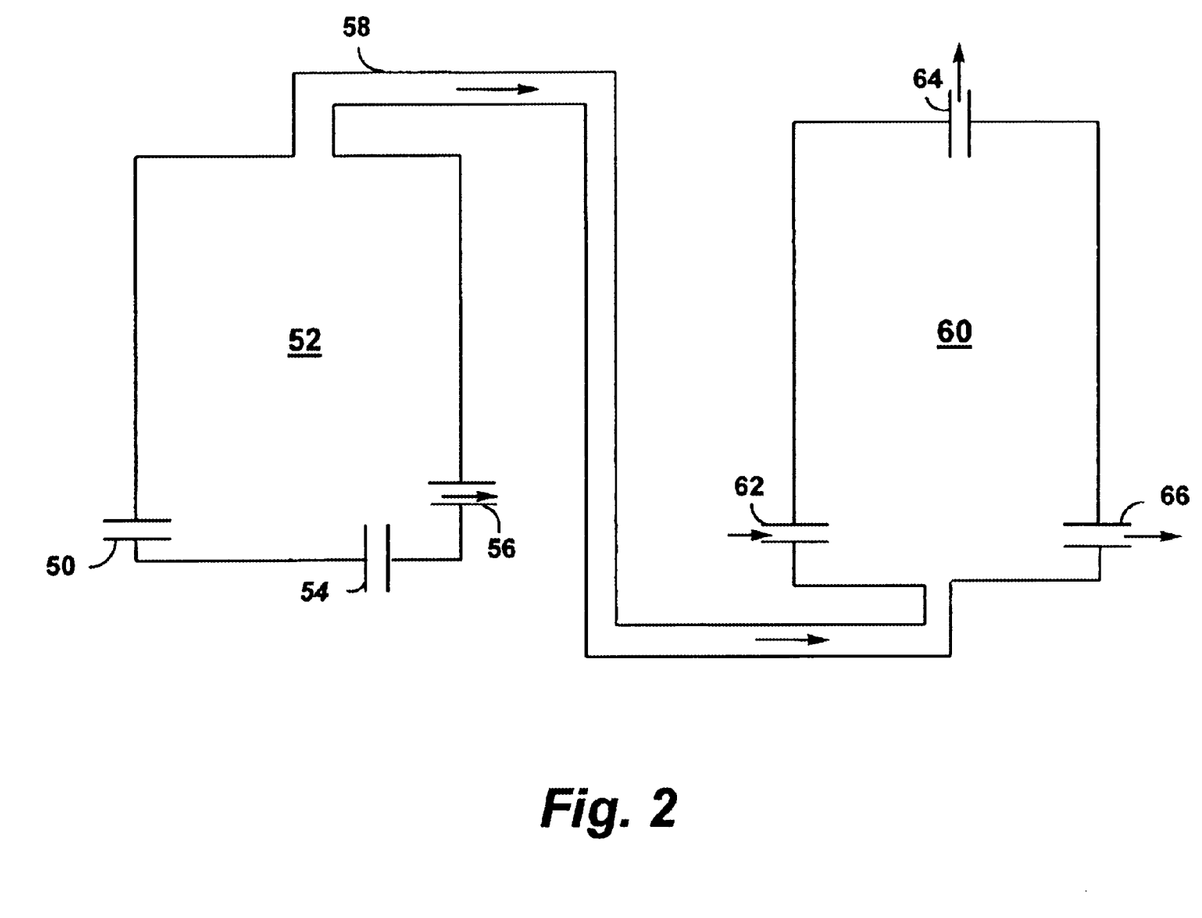
FIG. 2 is a schematic representation of an apparatus for a hydrogen polishing reaction step which can be used to further purify the hydrogen produced by the process of the present invention.

In other embodiments of the invention, additional reactors can be utilized for further polishing of the hydrogen produced in the hydrogenation reaction. An example of this is shown in the schematic of FIG. 2. Hydrogen gas with minor amounts of water in the form of steam and with minor amounts of other impurities can be directed, for example, from conduit 18 (FIG. 1), through inlet 50 into a first polishing vessel 52.

The first polishing vessel 52 is supplied with calcium oxide through entry port 54 and has an exit port 56 for removing spent calcium carbonate. The first polishing vessel 52 is preferably a fluidized bed, although other types of reaction vessels can be used. If needed, water is introduced into the first polishing vessel 52 through inlet 54 as steam or through a separate inlet as liquid or steam.

Reactions in the first polishing vessel 52 remove carbon compounds from the gas mixture by ultimately binding them as carbonates. Temperatures in the range from about 400° C. to about 1500° C. can be used for operating the first polishing vessel 52. Depending upon type of reactors, catalysts and pressures used, temperatures in the range from about 500° C. to about 1400° C. are presently preferred. Presently more preferred are first polishing vessel 52 operating temperatures in the range from about 500° C. to about 1200° C.

The first polishing vessel 52 generally can be operated at a broad range of pressures in the range from about 1 atmosphere to about 2000 atmospheres. Generally presently preferred, depending upon type of reactor used, are operating pressures in the range from about 1 atmosphere to about 1000 atmospheres. Presently more preferred first polishing vessel 52 operating pressures are in the range from about 10 atmospheres to about 200 atmospheres.

By operating the first polishing vessel 52 at lower temperatures than the carbonation vessel 12, by adding excess water to the reaction in the first polishing vessel 52, or by doing both, the residual partial pressure of carbon dioxide is lowered and the gas exiting the first polishing vessel 52 has been cleaned of carbon compounds. The gas exiting the first polishing vessel 52 is rich in hydrogen and may contain substantial amounts of water.

Gas exiting the first polishing vessel 52 is directed through conduit 58 into a second polishing vessel 60. The second polishing vessel 60 is also supplied with calcium oxide through entry port 62. A conduit 64 fluidly connected with the second polishing vessel 60 is provided for removal of hydrogen, and a port 66 for removal of calcium hydroxide is provided.

The second polishing vessel 60 can be operated at pressures in the range from about 0.5 atmosphere to about 1500 atmospheres. Depending upon type of reactor and temperatures used, it is generally preferred to operate the second polishing vessel 60 in the range from about 1 atmosphere to about 500 atmospheres, and more preferably in the range from about 1 atmosphere to about 200 atmospheres.

The second polishing vessel 60 can be operated at a cooler temperature in the range from ambient temperature to about 700° C. The second polishing vessel 60 is generally operated at temperatures in the range from about 200° C. to about 600° C., preferably from about 300° C. to about 500° C., so that the calcium oxide and water remaining in the hydrogen stream react to form calcium hydroxide.

$$CaO + H_2O \rightarrow Ca(OH)_2 \quad (12)$$

Reaction with the calcium oxide absorbs the water from the gas stream. The resulting calcium hydroxide will also react with any impurities that contain carbon, thereby further purifying the product stream. This second polishing step produces cleaner, drier hydrogen gas which can be collected or transported to a site for whatever application is intended.

When the invention process is used in combination with a high temperature solid oxide fuel cell driven by a portion of the hydrogen produced by the invention process, very high conversion efficiency of fuel energy to electrical energy can be achieved. The very high efficiency results in part from the high efficiency of fuel cells, combined with the ability to make use of the heat by-product from the fuel cells to calcine the calcium carbonate, thereby generating more hydrogen and, therefore, more electricity. Thus, fossil fuel consumption and carbon dioxide generation are significantly reduced.

With appropriate allocation of the water of reaction between the gasification and carbonation vessels, the present invention eliminates the need for heat transfer between the gasification and hydrogen production and carbonation reactions. Hydrogen gasification works well at temperatures as low as 600° C. and thus operates more efficiently than steam based gasification. The improved gasification process will lead to a more efficient use of coal since hydrogenation of coal leaves behind less excess char than the gasification of coal by steam. The higher overall efficiency of this process also leads to reduced $CO_2$ formation per unit of hydrogen.

Additional improvements in efficiency can be obtained by varying the temperature of the calcination reaction. By elevating the temperature at which the calcination reaction is carried out, one is also able to increase the pressure of the $CO_2$ output stream without the use of pumps.

Since no air or additional supply of oxygen is used in the hydrogen production portion of the invention process, the invention process completely avoids the use of a costly oxygen separation system such as those used in some coal gasification plants.

The problems associated with nitrogen oxide by-products of hydrogen producing facilities are reduced by the invention process since the only nitrogen compounds that must be dealt with are those due to pre-existing nitrogen compounds in the coal. The chemical reducing conditions that exist inside the gasification and carbonation vessels also do not favor the formation of nitrogen oxides.

The hydrogen produced by the invention process can be used both for efficient electricity generation and as a carbon-free fuel for various applications.

With the likely advent of increased regulation of carbon dioxide emissions, the generation of a substantially pure stream of carbon dioxide which can easily be sequestered and disposed of in a number of ways is a significant advantage.

While the apparatuses and processes of this invention have been described in detail for the purpose of illustration, the inventive apparatuses and methods are not to be construed as limited thereby. This patent is intended to cover all changes and modifications within the spirit and scope thereof.

INDUSTRIAL APPLICABILITY

The invention process and apparatus is useful for producing pure hydrogen and a pure stream of carbon dioxide from coal gasification. The hydrogen can be used to drive a high temperature fuel cell or in a gas turbine to produce electricity. The carbon dioxide can more easily be sequestered and disposed of since it may be produced in a substantially pure pressurized stream.

What is claimed is:

1. A process for producing hydrogen comprising:
   (a) contacting carbonaceous material with a first portion of hydrogen in a first reaction zone at a first temperature sufficient to produce a mixture of gases; and
   (b) contacting said mixture of gases with calcium oxide and a selected quantity of water in a second reaction zone at a second temperature, thereby producing a second portion of hydrogen and calcium carbonate, whereby said second portion of hydrogen is greater than said first portion of hydrogen.

2. The process recited in claim 1 further comprising:
   (c) transporting a portion of said second portion of hydrogen produced by contacting said mixture of gases with calcium oxide and water back into said first reaction zone.

3. The process recited in claim 1 further comprising:
   (d) calcining said calcium carbonate in a third reaction zone to produce calcium oxide and carbon dioxide and returning said calcium oxide produced in said third reaction zone to said second reaction zone.

4. The process recited in claim 2 further comprising:
   (e) calcining said calcium carbonate in a third reaction zone to produce calcium oxide and carbon dioxide and returning said calcium oxide produced in said third reaction zone to said second reaction zone.

5. The process recited in claim 1 wherein said first temperature is controlled by addition of water.

6. The process recited in claim 1 wherein said second temperature is controlled by selecting said selected amount of water.

7. The process recited in claim 1 wherein said selected quantity of water is allocated between said first and said second reaction zones at selected temperatures and states to control said first and said second temperatures.

8. The process recited in claim 7 further comprising calcining said calcium carbonate in a third reaction zone to produce calcium oxide and carbon dioxide and returning said calcium oxide produced in said third reaction zone to said second reaction zone.

9. The process recited in claim 1 wherein said first and said second reaction zones are in thermal communication.

10. The process recited in claim 3 further comprising maintaining reaction conditions in step (d) necessary to pressurize said carbon dioxide.

11. The process recited in claim 3 wherein said carbon dioxide is removed from said third reaction zone to enable sequestration thereof.

12. The process recited in claim 2 wherein hydrogen not transported to said first reaction zone is removed from said second reaction zone in a production stream.

13. The process recited in claim 1 wherein said hydrogen is removed from said second reaction zone in a production stream.

14. A process recited in claim 13 wherein said hydrogen removed from said second reaction zone in a production stream is purified.

15. The process recited in claim 14 wherein said hydrogen removed from said second reaction zone is purified by reaction with calcium oxide in a fourth reaction zone at a temperature in the range from about 400 to about 1500° C.

16. The process recited in claim 15 wherein impurities in said hydrogen removed from said second reaction zone in a production stream are removed by contacting said production stream with water.

17. The process recited in claim 15 wherein said hydrogen removed from said second reaction zone in a production stream and purified by reaction with calcium oxide is further purified with additional calcium oxide in a fifth reaction zone at a temperature in the range from about ambient temperature to about 700° C.

18. The process recited in claim 1 wherein said first temperature is from about 400° C. to about 2000° C.

19. The process recited in claim 1 wherein said first reaction zone is maintained at a pressure from about 0.5 atmosphere to about 2000 atmospheres.

20. The process recited in claim 1 wherein said second reaction zone is maintained at a temperature from about 400° C. to about 1500° C.

21. The process recited in claim 1 wherein said second reaction zone is maintained at a pressure in the range from about 1 atmosphere to about 2000 atmospheres.

22. The process recited in claim 3 wherein said third reaction zone is maintained at a temperature from about 800° C. to about 2000° C.

23. The process recited in claim 3 wherein said third reaction zone is maintained at a pressure from about 0.1 atmosphere to about 1500 atmospheres.

24. An apparatus for producing hydrogen from carbonaceous fuel comprising:
   (a) a gasification vessel including a port for introducing carbonaceous material, a port for removing ash, an input port for hydrogen, an input port for water, and an outlet port for gasification products; and
   (b) a carbonation vessel including a receiving port in fluid communication with said outlet port of said gasification vessel for said gasification products, an inlet port for water, an outlet port for hydrogen and steam, an inlet port for calcium oxide, and an outlet port for calcium carbonate.

25. An apparatus for producing hydrogen from carbonaceous material comprising:
   (a) a gasification vessel for gasification of carbonaceous material, said gasification vessel including a port for introducing carbonaceous material, a port for removing ash, an input port for hydrogen, and an outlet port for gasification products, and
   (b) a carbonation vessel for production of hydrogen by reaction of calcium oxide and water with said gasification products from said gasification vessel, said carbonation vessel including a receiving port in fluid communication with said outlet port of said gasification vessel for said gasification products, an inlet port for water, an outlet port for hydrogen and steam, an inlet port for calcium oxide, and an outlet port for calcium carbonate.

26. The apparatus recited in claim 24 further comprising: a conduit connected with said outlet port for hydrogen and steam, said conduit having thereon a valve for selectively diverting a first portion of said hydrogen and steam from said carbonation vessel into said gasification vessel and for selectively diverting a second portion of said hydrogen and steam to a hydrogen output.

27. The apparatus recited in claim 24 further comprising:
   (c) a calcination vessel connected to said carbonation vessel, said calcination vessel having an outlet for release of carbon dioxide and a means for heating said calcination vessel.

28. The apparatus recited in claim 24 wherein said calcination vessel is connected to said carbonation vessel with a conduit for transport of calcium carbonate from said carbonation vessel into said calcination vessel and wherein said calcination vessel is connected to said carbonation vessel with a conduit for transport of calcium oxide from said calcination vessel into said carbonation vessel.

29. The apparatus recited in claim 27 wherein said means for heating said calcination vessel is an electrical power generating device.

30. The apparatus recited in claim 27 wherein said means for heating said calcination vessel is a conduit for directing a portion of said hydrogen and steam from said gasification vessel to said calcination vessel.

31. The apparatus recited in claim 24 further comprising: a power generating device connected to said outlet port for hydrogen and steam, said electricity generating device having an outlet for release of steam and an inlet for introduction of oxygen into said electricity generating device.

32. The apparatus recited in claim 31 wherein said power generating device is a turbine.

33. The apparatus recited in claim 31 wherein said power generating device is a fuel cell.

34. The apparatus recited in claim 31 wherein said electricity generating device is connected with said calcination vessel so as to provide heat to said calcination vessel.

35. The apparatus recited in claim 24 wherein said gasification vessel and said carbonation vessel are fluidized bed reactors.

36. The apparatus recited in claim 27 wherein said calcination vessel is a fluidized bed reactor.

37. The apparatus recited in claim 24 further comprising:
   (h) a first polishing vessel in fluid communication with said outlet port for hydrogen and steam from said carbonation vessel, said first polishing vessel having an inlet port for water, and said first polishing vessel being in fluid communication with
   (i) a second polishing vessel in fluid communication with said first polishing vessel, said second polishing vessel having an outlet port for calcium hydroxide and an outlet port for hydrogen.

38. The apparatus recited in claim 37, said first polishing further comprising an inlet for calcium oxide and an outlet for calcium carbonate, and said second polishing vessel further comprising an inlet for calcium oxide.

* * * * *